May 31, 1927. 1,630,672
A. SAGE
COMBINED COVER HOLDING DOWN AND PRESSURE RELIEF DEVICE FOR MANWAYS
Filed March 12, 1925
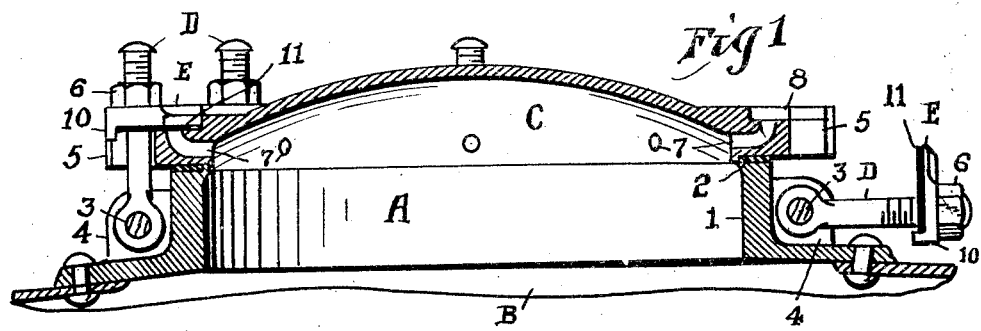
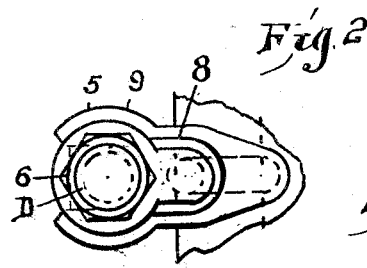
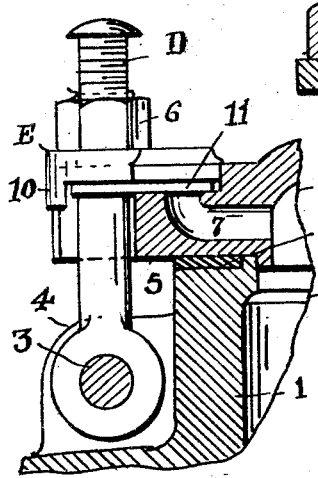
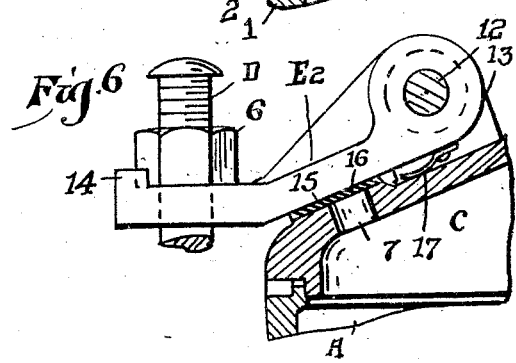
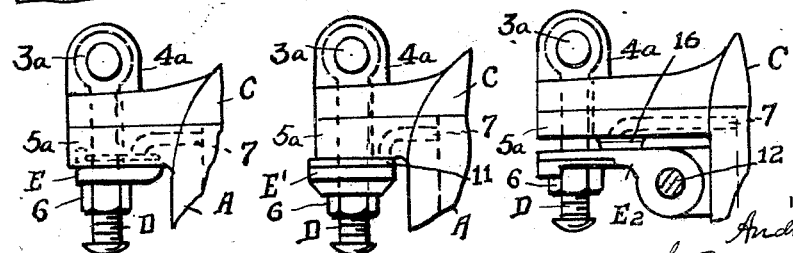

Patented May 31, 1927.

1,630,672

UNITED STATES PATENT OFFICE.

ANDREW SAGE, OF FARRELL BOROUGH, PENNSYLVANIA.

COMBINED COVER HOLDING-DOWN AND PRESSURE-RELIEF DEVICE FOR MANWAYS.

Application filed March 12, 1925. Serial No. 14,994.

Many containers for liquids, such for instance as tank cars, are provided with manways which are closed by covers usually held down by bolts.

In case pressure has accumulated in the container, when one or more of the bolts have been loosened, the covers sometimes are violently blown off, frequently doing direct injury to lives and property, and also releasing great volumes of combustible gases which are liable to ignition and explosion.

The object which I have in view is the provision of means for preventing such accidents.

I accomplish this object by providing means whereby the loosening of a manway cover bolt or other fastening means causes the gradual escape of pressure, and also gives warning of the existence of dangerous pressure. Thus I provide a port connecting the interior of the container to atmosphere and located adjacent to the bolt and which is uncovered by the loosening of the bolt so that pressure may escape therethrough. The escape of the pressure through the port will also, by causing a hissing sound, give warning of the necessity of care.

The workman may then partially loosen some or all of the remaining bolts, and thus lower the pressure below the danger point, before entirely releasing the cover.

In the accompanying drawings, wherein I have illustrated the principles of my invention, but which are however not intended to limit the scope of my invention to the construction shown. Fig. 1 is a diametric section through a manway and its cover, four of the clamping bolts being shown, and one of them released; Fig. 2 is a broken plan view of the same, showing one of the bolts and its washer; Fig. 3 is an enlarged detail of the left portion of Fig. 1; Fig. 4 is a detail in section showing the preferred assemblage of the nut and closure, and Figs. 5 to 9, inclusive are sectional details, similar to Fig. 3, but showing modifications.

The following is a detailed description of the drawings.

A represents the manway ring which may be an integral part of the container, or may be riveted or otherwise secured in place on the manway opening of a tank or other container B. Usually said openings and rings are circular, but they may also be oval or angular in shape.

The ring A is provided with an upwardly extending, defining flange 1 upon which the cover C is mounted. Frequently a compressible gasket 2 is provided to produce a gas-tight joint.

The manway cover is usually held in place by bolts spaced at intervals around the cover.

Thus, I use for this purpose swing bolts D pivotally or otherwise attached to either the ring or the cover and adapted to be placed or swung into position between twin ears on the other element with nuts which are then screwed down on the bolts to clamp them in position.

Thus in the embodiment shown in Figs. 1, 2, and 3, the bolts D are mounted on pins 3 between the sets of twin lugs 4, generally integral with the ring A, and said bolts are swung up between twin ears 5 extending from the cover C. 6 represents the nuts which are screwed on the bolts. The ends of the bolts may be upset as shown to prevent loss of the nuts.

7 represents small ports in the cover C, one adjacent to each pair of ears 5, and when unobstructed connecting the interior of the tank or other container to atmosphere. The ports are so located as to have their outer ends closed by closures or washers E mounted on the bolts D and tightened in place by screwing down the nuts 6.

In Figs. 1, 2 and 3, the washers are non-circular and fit down into recesses or seats 8 in the edge of the cover and the ears 5 are provided with vertical lips or flanges 9 which engage the edges of the washers. The washers may also be provided with depending lugs 10 which fit down between the outer ends of the ears 5.

Compressible gaskets 11 may be placed under the washers to provide gas-tight closures for the ports 7.

The interengagement of the washer E with the flanges 9 prevent the bolt being pried outwardly from engagement with the ears 5.

It is evident that with the bolts and washers in place, as shown at the left side of Fig. 1, and also in Figs. 2 and 3, and the nuts screwed down, the cover is snugly clamped in place and the ports 7 are completely closed.

When the manway cover is to be removed, the workman loosens one of the nuts slightly, so as to partially open the associated port 7. This will permit a limited escape of pressure, if such exists, and will result in a hissing sound, giving warning of the presence of dangerous pressure. If such is evidenced, the workman in like manner slightly loosens a number of or all of the remaining bolts and permits the pressure to become dissipated or reduced below the danger mark. The nuts may then be fully loosened, the bolts swung down and the cover lifted off.

When the nut is slightly loosened, the pressure against the washer may tip the same, thus binding the nut. To prevent this I may interengage the nut and washer as shown in Fig. 4, thus causing the nut and washer to move up and down as a unit.

In Fig. 5, I have shown the port closure in the form of a circular washer E'. In such an arrangement the nut 6 and washer E' may, if desired, be constituted as an integral element.

In Fig. 6 the closure is in the form of a latch member E² pivotally mounted on a pin 12 between twin lugs 13 on the cover and having a bifurcated end which swings down to be engaged by the bolt D. The free ends of the latch may be provided with upwardly extending flanges 14 which are engaged by the nut and prevent the bolt from being pried outwardly from engagement with the latch E². In this modification, the underside of the latch is provided with a surface 15 which may be provided with a compressible gasket 16, and which is clamped down over the outer end of the port 7.

17 is a spring which tends to elevate the latch when the nut is loosened, thus automatically unseating the port 7.

In Figs. 7, 8 and 9 I show the ports 7 in the manway ring instead of the cover, the bolts D being pivotally mounted on pins 3ª between twin lugs 4ª on the cover and swinging down between the twin ears 5ª which extend from the ring A.

It will be seen that Fig. 7 is thus a reversal of Fig. 3; Fig. 8 a reversal of Fig. 5; and Fig. 9 a reversal of Fig. 6.

It is evident from the foregoing description that my invention provides safety means which will obviate the cause of frequent and, in many cases, serious accidents in connection with manway covers.

What I desire to claim is:—

In combination with a manway ring and a cover therefor, one of said elements being provided with a pressure-relief port leading to atmosphere, cover-securing and pressure-relief means comprising a bolt adapted to clamp the cover to the manway, and a closure element embracing the bolt and having a projecting portion to cover the port, and a nut adapted to be screwed down on said bolt against said closure element and when tightened clamping said closure element in place and said cover on said manway.

Signed at Farrell, Pa., this 9th day of March, 1925.

ANDREW SAGE.